United States Patent [19]
Besson et al.

[11] Patent Number: 4,661,713
[45] Date of Patent: Apr. 28, 1987

[54] PHOTOVOLTAIC DIODE DETECTION DEVICE HAVING COMPENSATION FOR DEFECTIVE DIODES

[75] Inventors: Jean G. Besson, Meudon; Michel Royer, Paris; André A. Salaville, Egly; Michel B. Sirieix, Jouy-en-Josas, all of France

[73] Assignee: S.A.T., Paris, France

[21] Appl. No.: 678,271

[22] Filed: Dec. 4, 1984

[30] Foreign Application Priority Data

Dec. 8, 1983 [FR] France ................................ 83 19649

[51] Int. Cl.$^4$ ............................................. H01J 40/14
[52] U.S. Cl. .................................... 250/578; 358/213; 358/293; 250/235
[58] Field of Search ................ 250/578, 235; 358/213, 358/293; 324/73 AT, 73 PC, 133, 158 D, 52, 53; 371/10, 11

[56] References Cited

U.S. PATENT DOCUMENTS 4,464,754 8/1984 Stewart et al. ........................ 371/10
4,481,539 11/1984 Meise et al. .......................... 358/213

OTHER PUBLICATIONS

IBM Technical Disclosure Bulletin, vol. 23, No. 12, May 1981, New York (US); W. J. Craig: "Redundancy for Document Scanners", pp. 5288-5289, *en entier*.
WO-A-8 203 146 (RCA Corp.), *p. 2, ligne 5-p. 4, linge 6*.
Journal of Physics; Scientific Instruments, vol. 8, No. 5, 1975; P. W. Fry: "Silicon Photodiode Arrays", pp. 337-349.

Primary Examiner—Edward P. Westin
Assistant Examiner—William L. Oen
Attorney, Agent, or Firm—Stevens, Davis, Miller & Mosher

[57] ABSTRACT

The device includes at least two diode arrays which contain some diodes which are defective. The defective diodes are compensated in that the respective diodes of the two arrays are aligned in pairs along the scanning direction, with each of the pairs containing at least one good diode. The device also comprises a programmed memory for controlling two switches and for accomplishing a winding or serpentine readout of the arrays. The device is well adapted for landscape scanning.

9 Claims, 4 Drawing Figures

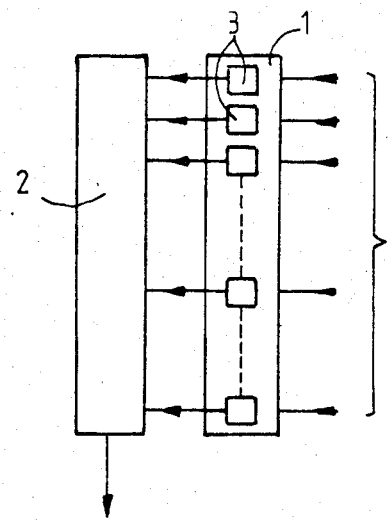
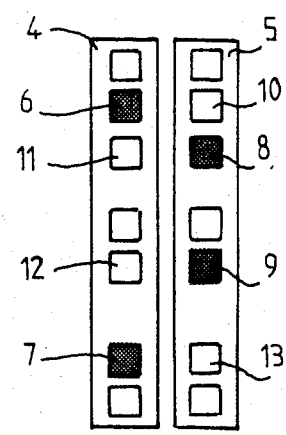
FIG. 1 (PRIOR ART)  FIG. 2
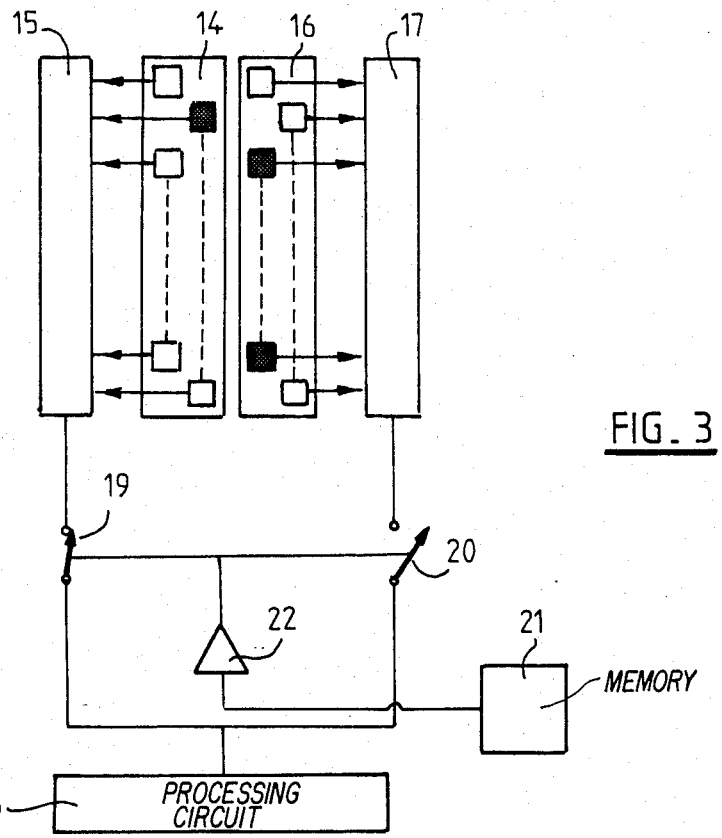
FIG. 3

PHOTOVOLTAIC DIODE DETECTION DEVICE HAVING COMPENSATION FOR DEFECTIVE DIODES

BACKGROUND OF THE INVENTION

The present invention relates to a detection device comprising a photovoltaic diode array.

Numerous detection systems, such as, for example, the charged coupled device (CCD) type detection system employing parallel scanning, comprise a basic module formed from an array of detector elements, for example, 128 HgCdTe photovoltaic diodes, when the detection takes place in the infrared wavelength range.

Parallel scanning involves causing a mirror to pivot in front of the diode array and the scene to be scanned, which may be for example, a landscape, so as to obtain the same result as if each of the diodes itself pivoted and scanned a line of this landscape. The output signals of the diodes are multiplexed before being fed to a processing circuit.

To ensure that there is no blank line in the video image downstream of the multiplexer, it is required that none of these diodes be defective.

The diode arrays in question are obtained from a wafer. In the case of a HgCdTe semiconductor crystal, several tons of these arrays may be obtained in each wafer. But, the efficiency has always been poor, despite some ten years or more of efforts in this art. This efficiency, i.e., the ratio between the numbers of arrays without defect and the total number of arrays of the wafer, has always been less than 10%. The material loss has then always been considerable. Furthermore, the selection of the non-defective arrays of a wafer has always been done manually, thus adding substantial labor costs to the material costs.

The cost of the above-mentioned detection systems has always therefore been very high, and the present invention aims at reducing the cost.

SUMMARY OF THE INVENTION

To overcome the above-described disadvantages in the prior art systems, the invention provides a detection device comprising a scanning mirror and a photovoltaic diode array, wherein the array is a defective array, i.e., an array containing some defective diodes, associated with at least one other adjacent defective photovoltaic diode array, so as to associate the respective diodes of the two arrays in pairs of diodes, with at least one diode in each pair being non-defective. The invention comprises means for selecting the output signal of this non-defective diode, so as to effect serpentine readout of the diodes by selecting the non-defective diodes in the various diode pairs for readout. This readout winds in serpentine fashion, e.g., along dashed line A, shown in FIG. 2.

According to the invention, which allows defective arrays to be used, at least two of which counterbalance each other mutually since the diodes are associated in pairs having at least one non-defective diode, the number of usable arrays obtained from the same wafer becomes considerably higher, up to an efficiency of 95%, i.e., several tens of arrays per wafer. With the invention, therefore, no longer will practically 90% of the production be wasted. Furthermore, since the two arrays of the device of the invention are associated with a single mirror, the device receives only one and the same incident signal in a single focal plane of a single optical device.

The selection means of the device of the invention functions to select one or the other of the output signals of the two diodes of each pair, so that the pairs are disposed in alignment in the scanning direction so that no line is blank. In other words, each diode pair is aligned in the scanning direction. The invention is therefore directed to means for managing defects in components. In a preferred embodiment of a device of the invention, the management means comprises a memory, containing a management program, and switching means controlled by the memory for selecting one of the output signals, advantageously multiplexed, of the diodes in the diode pairs formed by the two arrays, and for eliminating the output signal of the other one.

BRIEF DESCRIPTION OF THE DRAWINGS

The invention will be better understood from the following description of a preferred embodiment of the device of the invention with reference to the accompanying drawings, in which:

FIG. 1 shows schematically a prior art detection device;

FIG. 2 shows schematically the detection device of the invention;

FIG. 3 shows the detection device of the invention with its defect management means.

DESCRIPTION OF THE PREFERRED EMBODIMENT

Figure 4:
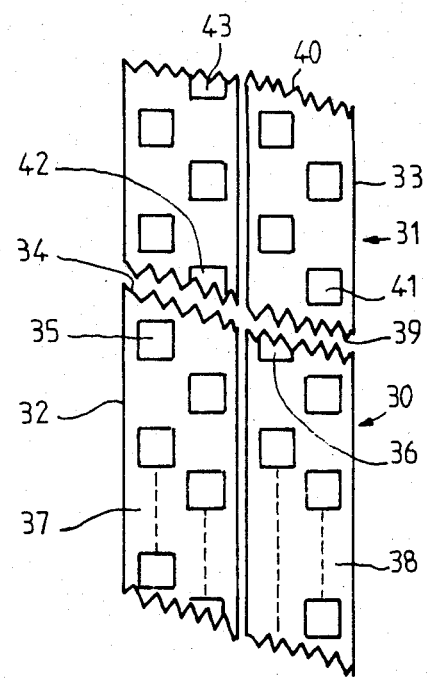
FIG. 4 shows schematically one embodiment of connected detection submodules or array portions according to the invention.

As mentioned above, the invention applies particularly to infrared systems of the well known CCD type. This does not form a limitation of the invention. Whether the detection device employs a CCD circuit or any other circuit for processing or analyzing the output signals of the detection device of the invention, this circuit need not and will not be described herein since such circuits are thoroughly known by those skilled in the art.

FIG. 1 shows a prior art detection device comprising a detection array 1 and a multiplexer 2 whose output is therefore connected to a processing circuit, not shown. A scanning mirror (not shown) is provided for scanning, e.g., a landscape, in order to obtain a video analysis thereof. The scanning mirror is positioned upstream of the detection device.

Array 1 comprises a plurality of photovoltaic diodes 3, in this case 128 HgCdTe diodes, disposed in a column and each sweeping a line of the landscape. The output signals of diodes 3 are fed, preferably through amplifiers, not shown, to the inputs of multiplexer 2.

Diodes 3 are without defect.

FIG. 2 shows schematically the detection device of the invention. It comprises two arrays 4, 5 similar to array 1, but arrays 4, 5 include photovoltaic diodes, some of which are defective. Thus, diodes 6, 7 of the column of diodes in array 4 and diodes 8, 9 of the column of diodes in array 5 are defective. The diodes of the two arrays are respectively associated in pairs parallel respectively to the scanning lines, i.e., aligned in the scanning direction. Each of these pairs comprises at least one non-defective diode. Thus, pair 6, 10 comprises defective diode 6 of array 4, but good diode 10 of array 5; pair 11, 8 comprises good diode 11 of array 4.

Pair 12, 9 comprises good diode 12 of array 4; pair 7, 13 comprises good diode 13 of array 5.

It is noted that the invention is not limited to the association of only two defective arrays, but more than two defective arrays could be, of course, just as well associated together.

It is also emphasized that while the two diode columns of the device of the invention are generally disposed on two different arrays, it may happen that two adjacent columns in the same starting arrays may be used. In this case, there is, in actual fact, only one diode support. Still in this case, the two diode columns forming the same monolithic assembly have the same optoelectronic characteristics, i.e., the same optical yield and the same wavelength. In both cases, whether it is a question of one or two arrays, a single cryostat is sufficient.

As shown in FIG. 3, the topology of the arrays is such that the diodes are disposed in a staggered arrangement, on the one hand, in each of the arrays and, on the other, from one array to the other, for manufacturing and machining reasons and in order to enable the diodes to be more concentrated or densely packed. Nevertheless, applicants have succeeded in disposing on each array two diode columns spaced apart widthwise by 36 micrometers, with the diodes being 36 micrometers in width and 50 micrometers in height, and in disposing two of these diode arrays so that their respective adjacent columns are also spaced apart widthwise by only 36 micrometers, with the adjacent diodes of two adjacent columns being spaced heightwise by 72 micrometers.

The diodes of array 14 of FIG. 3 are connected to the multiplexer 15 and those of array 16 to multiplexer 17. The defective diodes are again shown in black.

The two multiplexers are connected to a processing circuit 18 through two analog switches 19, 20, respectively. These two switches could, of course, be replaced by a single analog switch.

The two switches are controlled by a memory 21 through an amplifier 22.

Memory 21 contains a logic program for managing the defects of arrays 14, 16 so as to select, for each scanning line, the output signal from one or the other of multiplexers 15 and 17 and so as not to take the output signal of the other one into account.

Memory 21 may be a PROM (programmable read only memory), containing a program prepared at the time of testing the diodes of the wafers, or an EEPROM (electrically erasable PROM), whose program may be modified during use of the device for the case where other diodes become defective. Such modification can be made either on the occasion of maintenance work or automatically by means of a controller.

Finally, the detection device described above comprises a multidimensional matrix of programmed readout diodes. Readout of the diode columns of the device is serpentine or winding, so as to take into account only the good diodes.

To take into account switching from one array to the other, and also the spatial staggering of the associated arrays, a delay line is disposed advantageously, for example, at the input of multiplexer 17, for phase resetting of the signals of the two multiplexers.

From the solution provided by the invention as described above, it is possible to further improve the production yield, i.e., to increase the usable portion of the production yield resulting from the starting wafers.

It is, in fact, possible to isolate detection submodules or array portions already comprising at least two associated array portions having respective diodes associated in pairs, one at least of which is not defective, and to connect them together by placing them end-to-end. This connection is to be made along an oblique line, or better channel, and consequently these subassemblies are to have been previously cut obliquely.

It should be noted that while these submodules or array portions may, at the outset and before being cut out perfectly well, comprise only non-defective diodes; once they are connected together, they may again comprise, on each side of the oblique connecting channels, pairs of diodes, one at least of which is defective, having become so during the cutting out operation.

FIG. 4 shows one embodiment of connected submodules or array portions.

From a double array of diodes paired in line, or even from two or more of these double arrays, a first submodule 30, a second submodule 31, and other submodules (not shown), have been cut out.

The cutting has been done slantwise, i.e., not perpendicularly to side walls 32, 33 of the double array, or along channels or lines slanted with respect to the paired diode lines.

Module 30 has been cut along irregular line 34, keeping diodes 35 of first array 37, but not keeping diode 36 which is disposed along line 34, of second array 38. Module 31 has been cut along irregular lines 39, 40, with diode 41 of array 38 having been kept, but not keeping diodes 42 and 43 of diode 37. the irregularity of lines 34, 39, 40 has been caused by the cutting out.

By placing submodules 30 and 31 end-to-end using conventional means, such as a bonding agent, a discontinuity is caused along lines 34 and 39, because of their irregularity, but this discontinuity does not adversely affect the detection since the diodes remain paired in lines along the scanning direction, with at least one good diode per scanning line, because of the oblique arrangement of the connection. Thus, in the line of diodes 35, 36, detection will be provided by diode 35 of array 37, and in the line of diodes 42, 41, detection will be provided by diode 41 of array 38.

It is apparent that if the cutting out were done perpendicularly to walls 32, 33, the reconstituted double array would comprise blank lines of diodes, and thus an unworkable device would result.

With the arrangement according to the invention, it is therefore possible not only to cut out submodules or array portions from the double arrays, with one or two starting wafers so as to maximize the production, but double arrays may be formed of a longer length than could be obtained from starting wafers of given dimensions.

In the case where the diodes are spaced apart at the beginning by a substantial distance, for example, on the order of 200 micrometers, the submodules will be cut out by mechanical means, for example, by sawing. In the case where the diodes are very closely spaced apart on the surface of the arrays, on the one hand, and where the thickness of the starting wafer or wafers is small, for example, less than 100 micrometers, in the other hand, chemical or ionic etching will be used.

Of course, the reconstitution of "composite" arrays is also possible when the diodes are disposed in a quincunx or staggered arrangement.

What is claimed is:

1. A detection device comprising:

a first array of photovoltaic diodes for producing output signals, wherein the first array includes some defective diodes;

at least a second array of photovoltaic diodes for producing output signals, said second array being adjacent to said first array, some of the diodes of said second array being defective, corresponding diodes of the first and second arrays being arranged in diode pairs aligned along a scanning direction, each of said pairs comprising at least one diode which is non-defective; and selection means for selecting the output signal of a non-defective diode in each diode pair so as to effect readout of the diodes in serpentine fashion.

2. The device as claimed in claim 1, wherein said selection means comprises a memory containing a management program and a switching means controlled by the memory for selecting one of the output signals of the two arrays and for eliminating the other output signal.

3. The device as claimed in claim 2, further comprising two multiplexers which have inputs and which are respectively associated with said first and second arrays, the diodes of each array being connected to the inputs of the corresponding multiplexer.

4. The device as claimed in claim 2, wherein the memory is a PROM.

5. The device as claimed in claim 2, wherein the memory is an EEPROM.

6. The device as claimed in claim 2, wherein the switching means comprise two analog switches.

7. The device as claimed in claim 2, wherein the switching means comprise one analog switch.

8. The device as claimed in claim 1, wherein the diodes of said pairs of diodes are disposed along paired diode lines and the diode arrays are formed from array portions connected along lines which are slanting with respect to the paired diode lines.

9. The device as claimed in claim 1, wherein the diodes of the arrays are HgCdTe diodes.

* * * * *